US009781124B2

(12) United States Patent
Goldberg et al.

(10) Patent No.: US 9,781,124 B2
(45) Date of Patent: Oct. 3, 2017

(54) CONTAINER-BASED SYSTEM ADMINISTRATION

(71) Applicant: International Business Machines Corporation, Armonk, NY (US)

(72) Inventors: George Goldberg, Bat Yam (IL); Yosef Moatti, Haifa (IL); Dmitry Sotnikov, Givataim (IL); Yaron Weinsberg, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 14/736,297

(22) Filed: Jun. 11, 2015

(65) Prior Publication Data

US 2016/0366104 A1    Dec. 15, 2016

(51) Int. Cl.
*H04L 29/06* (2006.01)
*G06F 9/455* (2006.01)
*G06F 21/53* (2013.01)
*G06F 3/023* (2006.01)
*G06F 7/04* (2006.01)
*G06F 15/16* (2006.01)
*G06F 17/30* (2006.01)

(52) U.S. Cl.
CPC ............ *H04L 63/102* (2013.01); *G06F 3/023* (2013.01); *G06F 9/45558* (2013.01); *G06F 21/53* (2013.01); *G06F 2009/45587* (2013.01)

(58) Field of Classification Search
None
See application file for complete search history.

(56) References Cited

U.S. PATENT DOCUMENTS

| 7,650,627 | B1 * | 1/2010 | Stancheva ........... G06F 12/1491 |
| | | | 380/59 |
| 8,549,289 | B2 | 10/2013 | Grebenik et al. |
| 8,793,688 | B1 | 7/2014 | Mustacchi et al. |
| 9,122,562 | B1 * | 9/2015 | Stickle ...................... G06F 8/71 |
| 9,256,467 | B1 * | 2/2016 | Singh .................... G06F 9/5055 |
| 9,471,353 | B1 * | 10/2016 | Christopher ........ G06F 9/44521 |
| 2006/0184926 | A1 * | 8/2006 | Or ............................ G06F 8/61 |
| | | | 717/168 |

(Continued)

FOREIGN PATENT DOCUMENTS

CN    201210573382    4/2013

*Primary Examiner* — Eric Chen
(74) *Attorney, Agent, or Firm* — Daniel Kligler

(57) ABSTRACT

Methods, computing systems and computer program products implement embodiments of the present invention that include defining a first multiple of software container configurations and a second multiple of permission sets, and receiving, by a first computer, a request to perform a service operation on a second computer having multiple resources. Upon identifying one or more of the resources that are required for the service operation, a given software container configuration and a given permission set are selected based on the identified one or more resources, and the given software container configuration and the given permission set are conveyed to the second computer. Upon the second computer receiving the given software container configuration and the given permission set, a software container is generated. The software container is opened on the host computer prior to performing the service operation, and closed upon completing the service operation.

17 Claims, 5 Drawing Sheets

(56) References Cited

U.S. PATENT DOCUMENTS

| | | |
|---|---|---|
| 2007/0073851 A1 | 3/2007 | Baikov et al. |
| 2008/0109876 A1* | 5/2008 | Hitomi .................... G06F 9/468 |
| | | 726/2 |
| 2008/0256534 A1* | 10/2008 | Chess ................. G06F 9/45558 |
| | | 718/1 |
| 2015/0347746 A1* | 12/2015 | Martel .................... G06F 21/53 |
| | | 726/1 |
| 2016/0065618 A1* | 3/2016 | Banerjee ................ H04L 63/20 |
| | | 726/1 |
| 2016/0092252 A1* | 3/2016 | Wagner ............... G06F 9/45533 |
| | | 718/1 |
| 2016/0224785 A1* | 8/2016 | Wagner .................. G06F 21/53 |

* cited by examiner

CONTAINER-BASED SYSTEM ADMINISTRATION

FIELD OF THE INVENTION

This invention relates generally to system administration, and specifically to constraining and controlling system administration via software container encapsulation.

BACKGROUND

Operating system virtualization technologies include hypervisors that implement virtual machines and software containers that provide "thin" layers of abstraction and automation of operating-system-level virtualization. Although virtual machines implement hardware-level virtualization that provide great encapsulation, their overhead makes them too costly for system administration, and their high level of isolation makes resource sharing more difficult. On the other hand, software containers enable controlled access of the host operating system and do not require a hypervisor. Containers are lightweight and provide better performance, thereby enabling faster provisioning for efficient system management.

The description above is presented as a general overview of related art in this field and should not be construed as an admission that any of the information it contains constitutes prior art against the present patent application.

SUMMARY

There is provided, in accordance with an embodiment of the present invention a method, including defining a first multiple of software container configurations and a second multiple of permission sets, receiving, by a first computer, a request to perform a service operation on a second computer having multiple resources, identifying one or more of the resources that are required for the service operation, selecting, based on the identified one or more resources, a given software container configuration and a given permission set, and conveying the given software container configuration and the given permission set to the second computer.

There is also provided, in accordance with an embodiment of the present invention a computing facility, including multiple computers configured to communicate over a network, wherein a first given computer is configured to define a first multiple of software container configurations and a second number of permission sets, to receive a request to perform a service operation on a second given computer having multiple resources, to identify one or more of the resources that are required for the service operation, to select, based on the identified one or more resources, a given software container configuration and a given permission set, and to convey the given software container configuration and the given permission set to the second given computer.

There is further provided, in accordance with an embodiment of the present invention a computer program product, the computer program product a non-transitory computer readable storage medium having computer readable program code embodied therewith, the computer readable program code executing on a first computer and including, computer readable program code configured to define a first multiple of software container configurations and a second multiple of permission sets, computer readable program code configured to receive a request to perform a service operation on a second computer having multiple resources, computer readable program code configured to identify one or more of the resources that are required for the service operation, computer readable program code configured to select, based on the identified one or more resources, a given software container configuration and a given permission set, and computer readable program code configured to convey the given software container configuration and the given permission set to the second computer.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
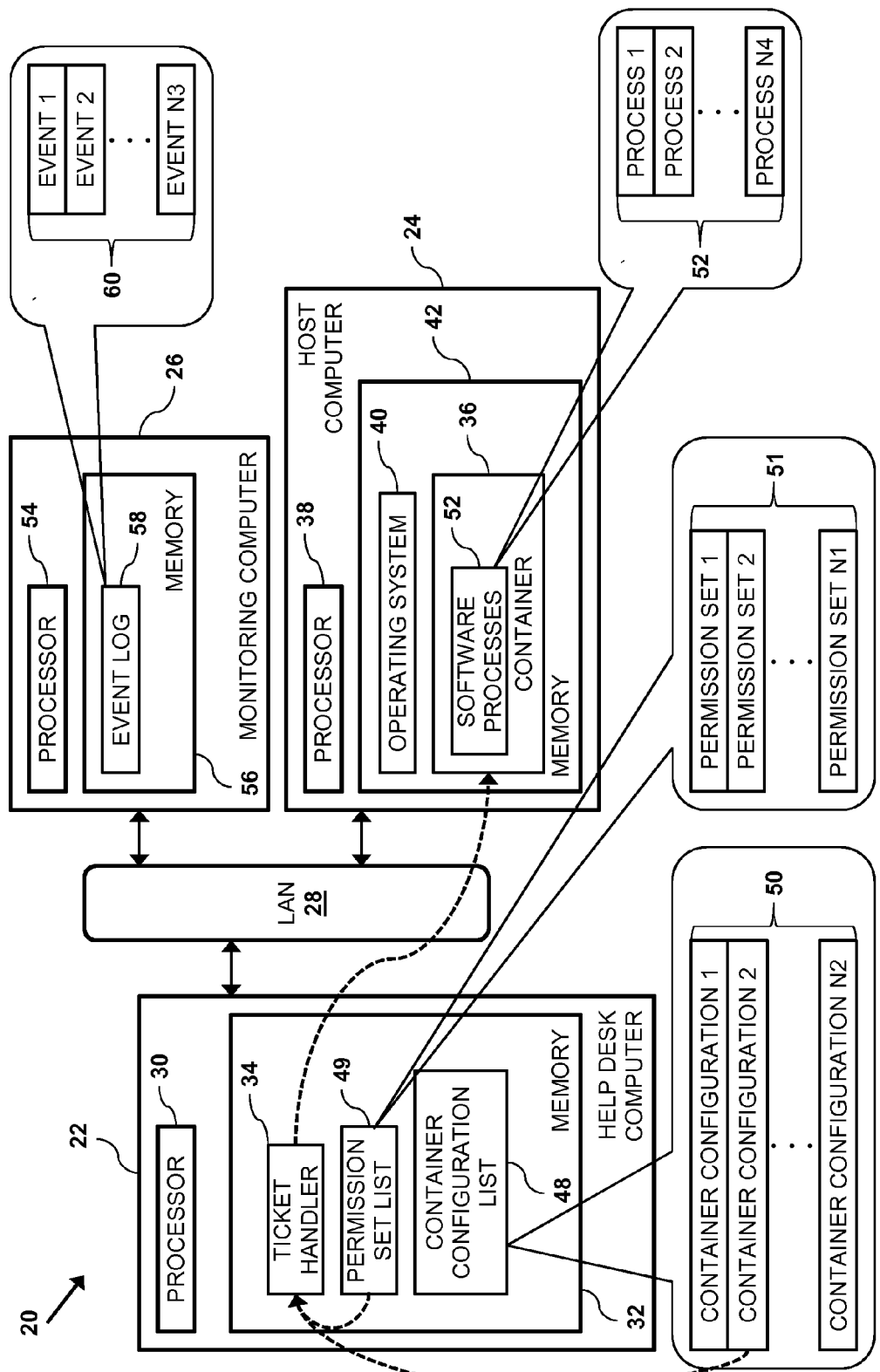
FIG. 1 is a block diagram that schematically illustrates a computing facility configured to perform container-based system administration for a host computer, in accordance with an embodiment of the present invention.

System administrators are typically granted a set of permission levels that enable them to fully control and modify a running system. By default, a full set of permissions is typically granted to system administrators in order to perform service operations. However, the full set of permissions is rarely required to perform a given service operation, and consequently, rogue system administrators can utilize the permissions to steal sensitive user data that can be protected without impacting the service operation.

With the proliferation of cloud computing, entrusting a system administrator with an appropriate set of permissions becomes even more critical, since cloud customers need to trust a system administrator that may not be part of their organization. In some instances, the administrator may be employed by a competing company.

Embodiments of the present invention provide methods and systems for providing a lightweight and scalable administration platform that allows cloud provider environments to both monitor and restrict system administrator privileges and actions in order to avoid data leakages and other security breaches. As described hereinbelow, a first multiple of software container configurations and a second multiple of permission sets are defined, and upon receiving, by a help desk computer, a request to perform a service operation on a host computer, one or more resources on the host computer that are required for the service operation are identified.

The resources comprise hardware modules such as storage devices and software modules such as file systems. For example, if the service operation comprises configuring the host computer to access a table on a database server, the resources may comprise database client software (that enables the host computer to communicate with the database server), and permission to access the table.

The help desk computer can select, based on the identified one or more resources, a given software container configuration and a given permission set, and convey the given software container configuration and the given permission set to the host computer. Upon receiving the given software container configuration and the given permission set, the host computer can generate, using the given software container configuration and the given permission set, a software container, and start executing the generated software container, thereby enabling a system administrator to perform the service operation. In some embodiments, the container can be opened upon receiving a login command from the system administrator, and the container can be closed upon receiving a logout command from the system administrator.

By utilizing software container technology, embodiments of the present invention can restrict a system administrator to a limited view of the host's operating system and system services that is sufficient for handling an administrative task. In some embodiments, a set of containers which correspond to specific administrative tasks can be preconfigured in order to limit the power of the system administrator, while at the same time providing enough capabilities to accomplish specific tasks.

In additional embodiments, every action made by the system administrator can be monitored and logged. Examples of system administrator actions (also referred to herein as events) include, but are not limited to, file system interactions, networking requests and data movement, and service control (launch, stop, etc.). Additionally, some dynamic prevention actions may be taken based on on-line monitoring analysis (e.g., container blocking if an attack was discovered). Therefore systems implementing embodiments of the present invention can avoid data leakages and other security breaches (including cloud security exposure) by (a) controlling and limiting a set of capabilities given to the system administrator, and (b) recording all the system administrator's actions, which enables detection and containment of security infringements.

FIG. 1 is a block diagram that schematically illustrates a computing facility 20 configured to perform container-based system administration, in accordance with an embodiment of the present invention. Computing facility 20 comprises a help desk computer 22 (also referred to as a first computer), a host computer 22 (also referred to herein as a second computer) and a monitoring computer 24 (also referred to herein as a third computer) that communicate via a local area network (LAN) 28.

First computer 22 comprises a first processor 30 and a first memory 32. In operation, processor 30 executes, from memory 32, a ticket handler application 34 that generates service tickets (not shown) for host computer 24. While the configuration in FIG. 1 shows a single host computer 24, facility 20 may comprise multiple host computers 24, and application 34 can be configured to generate a given service ticket for any given host computer 24.

Second computer 24 comprises a second processor 38 that executes an operating system 40 from a second memory 42. In a first non-virtualized embodiment, processor 38 receives, from computer 22, a given container configuration 50 and a given permission set 51, and uses the received container information and the received permission set to generate software container 36. A second virtualized environment is described in the description referencing FIG. 2 hereinbelow.

In embodiments of the present invention, processor 30 can store, in memory 32, a container configuration list 48 comprising multiple preconfigured container configurations 50, each of the preconfigured container configurations corresponding to a specific administrative task, and providing, to a system administrator, access to a subset of the resources on host computer 24. A given container configuration 50 may comprise a software application that is needed to perform the service operation (e.g., an updated version of database client software), and may also indicate one or more branches of a file system that need to be accessed while performing the service operation.

Processor 30 also stores, in memory 32, permission set list 49 comprising multiple preconfigured permission sets 51, each of the preconfigured permission sets corresponding to a specific administrative task, and providing, to a system administrator, permissions to a subset of the resources on host computer 24.

In embodiments of the present invention, upon receiving a given container configuration 50 and a given permission set 51, processor 38 generates (e.g., by executing container management software such as Docker™) a container 36, thereby enabling a system administrator to perform a required service operation. While executing container 36 (i.e., during the service operation), processor 38 may execute one or more software processes. For example, while being serviced, processor 38 may execute, within container 36, a spreadsheet application, a web browser, and a database application.

Third computer 26 comprises a third processor 54 and a third memory 56 that stores an event log 58 comprising multiple events 60. When processor 38 executes container 36 while host computer 24 is being serviced, the second processor can convey, to event log 58, all "events" that a system administrator performs during the service operation. Examples of events 60 include, but are not limited to, keyboard input and file operations.

While the configuration in FIG. 1 shows event log 58 managed by processor 54, and stored on computer 26, the event log can be managed by any of the processors and stored on any of the computers in facility 20, not including the host computer being serviced. For security purposes, computer 26 is typically not collocated with any host computer 24, thereby preventing system administrators performing service operations from accessing and modifying log 58.

When managing event log 58, processor 54 can trace and audit all actions taken by the system administrator during the process of resolving the ticket. The information can be easily collected by a service (such as Guardium™) that will allow a cloud provider to meet current and future regulations regarding its IT personnel.

To generating container 36, application 34 can augment the ticket creation phase with a feature extraction process that generates a ticket profile comprising features such as:
- Operating-System-Type (e.g., Linux™, and Windows™)
- Ticket-Class (e.g., "access", "installation issue" and "performance").
- Ticket-Area (e.g., "network", "storage", "GPU" and "multi-tier application").
- Ticket-Locality-Type (e.g., single or multiple hosts).
- Service-Type (e.g., "DNS", "Swift™", "Keystone™" and "Guardium™").

In operation, application 34 can utilize the extracted features to choose container configurations 50 that should both be suitable for handling the issue described in the ticket and also near minimal in term of granted capabilities. To generate container configurations 50, application 34 can:

Denote a ticket with $T_i$.

For each Ti, extract a set of K[Ti] features:
$F=\{f_1, f_2, \ldots, f_{K[Ti]}\}$.

For each set F obtain a potential container configuration set:
$I=\{Im_1, Im_2, \ldots, Im_n\}$.

calculate a placement map. For example, for each container configuration to be deployed, associate a set of machines that will host the container:
$\forall Im_j \in I, H_j=\{h_{j,1}, h_{j,2}, \ldots, h_{j,1_j}\}$ Upon calculating the map, application 34 can automatically deploy the container configurations and update the ticket with the set of container credentials that will be used by the system administrator to connect to the container configurations for resolving the ticket. Additionally, once the ticket is resolved by the system administrator application 34 can automatically revokes all tokens and removes the containers from their associated host computer(s).

When configuring container configurations 50, ticket handler application 34 can use the following mechanisms to enable fine-grained control over system administrator activities:

Administrative tool-set deployment and management. A system administrator may expect a set of tools to exist in a standard server installation. In some embodiments, ticket handler application 34 can create layered container configurations 50 in order to provide a "tuned" container 36 for a specific ticket. In other words, host computer 24 may comprise a set of resources, and each container configuration 50 has access to a respective subset of the resources. Additionally, ticket handler application 34 can allow for additional installations via a dedicated repository.

File system overlays. Ticket handler application 34 can define a set of files that are visible from within a given container configuration 50 (and their associated permissions).

Process control. In order to be able to administer host computer 24 (or virtual machine 46), ticket handler application 34 can enable container 36 to control a subset of processes running at its containing host computer (for example, using Linux™ DBus to interact with the system administrator), or a virtual machine within the host computer. This can be more secure that granting a system administrator full root services on host computer 24, as the ticket handler application can control and audit interaction with the host computer.

Ticket handler application 34 can utilize IPC and network isolation in order to limit connectivity of administrative containers to the minimum set, thereby preventing a system administrator from connecting to an arbitrary computer at an arbitrary time.

Ticket handler application 34 can constrain, within container 36, resource availability to the system administrator via mechanisms such as 'cgroups'. This mechanism enables ticket handler application 34 to control any overhead incurred by administrative containers running on a specific host 24.

Device access control. Unless physical device access is required, ticket handler application 34 can define device access rights.

Tapping, Masquerading and Omission. Embodiments of the present invention enable injection of runtime logic directly into the data path. Specifically, by monitoring network packets, file system data access and command line interaction embodiments of the present invention can identify security threats originating from administrators.

The following comprise sample uses for the proposed monitoring logic:

Detecting a download multimedia content (e.g. *.jpg, *.mp4, etc.) over network 28, thereby enabling facility 20 to monitor the actions of a rogue administrator trying to download sensitive data from a remote server and to block them immediately upon breach discovery.

Detecting sensitive data that is "masqueraded". For example, an administrator my attempt to view a file containing credit card numbers will only see "**-***-**" instead of the real numbers. This may be used, for instance, when the administrator is given permissions to read the file (for instance in order to check that it can indeed be read) while on the other hand preventing him/her from accessing the actual sensitive data of the file.

By tracking command line history, facility 20 can audit reports of administrator's actions, e.g., an input to host computer 24 that will enable the administrator to further constrain the container configurations, and granted permissions based on a specific ticket, training, etc.

Figure 2:
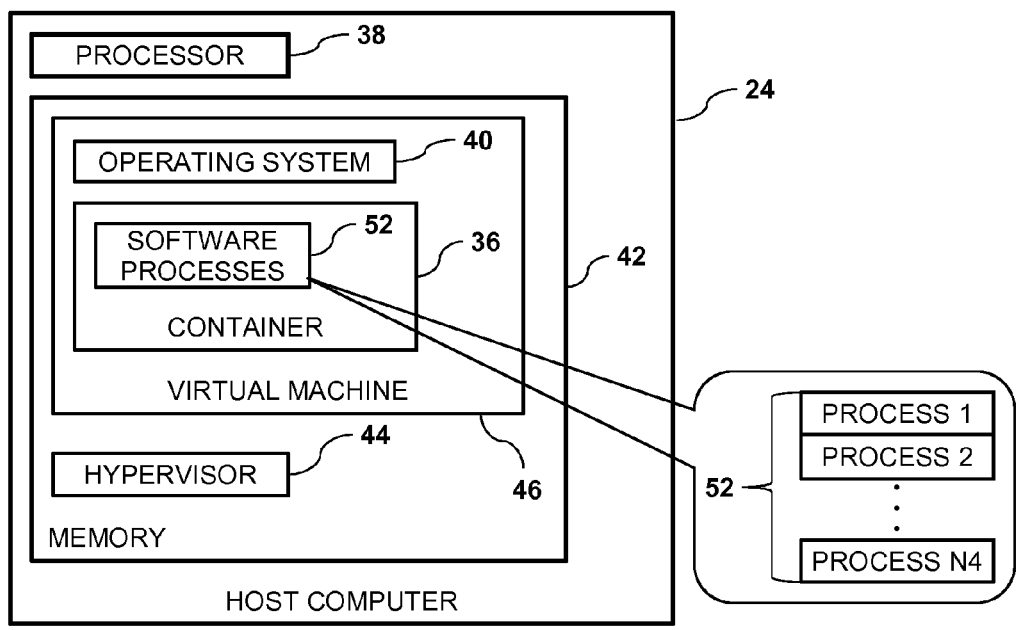
FIG. 2 is a block diagram that schematically illustrates an alternative configuration of the host computer, in accordance with an embodiment of the present invention.

FIG. 2 is a block diagram that schematically illustrates an alternative configuration of host computer 24, in accordance with an embodiment of the present invention. In the configuration shown in FIG. 2, processor 38 executes, from memory 42, a hypervisor 44 that creates a virtual machine 46 in the second memory, and the second processor generates and executes container 36 within the virtual machine. While the configuration in FIG. 1 shows a single virtual machine 46 in memory 42, hypervisor 44 may define multiple virtual machines 46 in the second memory, and processor 38 can generate and execute container 36 within any given virtual machine 46.

Processors 30, 38 and 54 comprise general-purpose central processing units (CPUs) or special-purpose embedded processors, which are programmed in software or firmware to carry out the functions described herein. The software may be downloaded to computers 22, 24 and 26 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Service Ticket Processing Using Custom Software Containers

Figure 3:
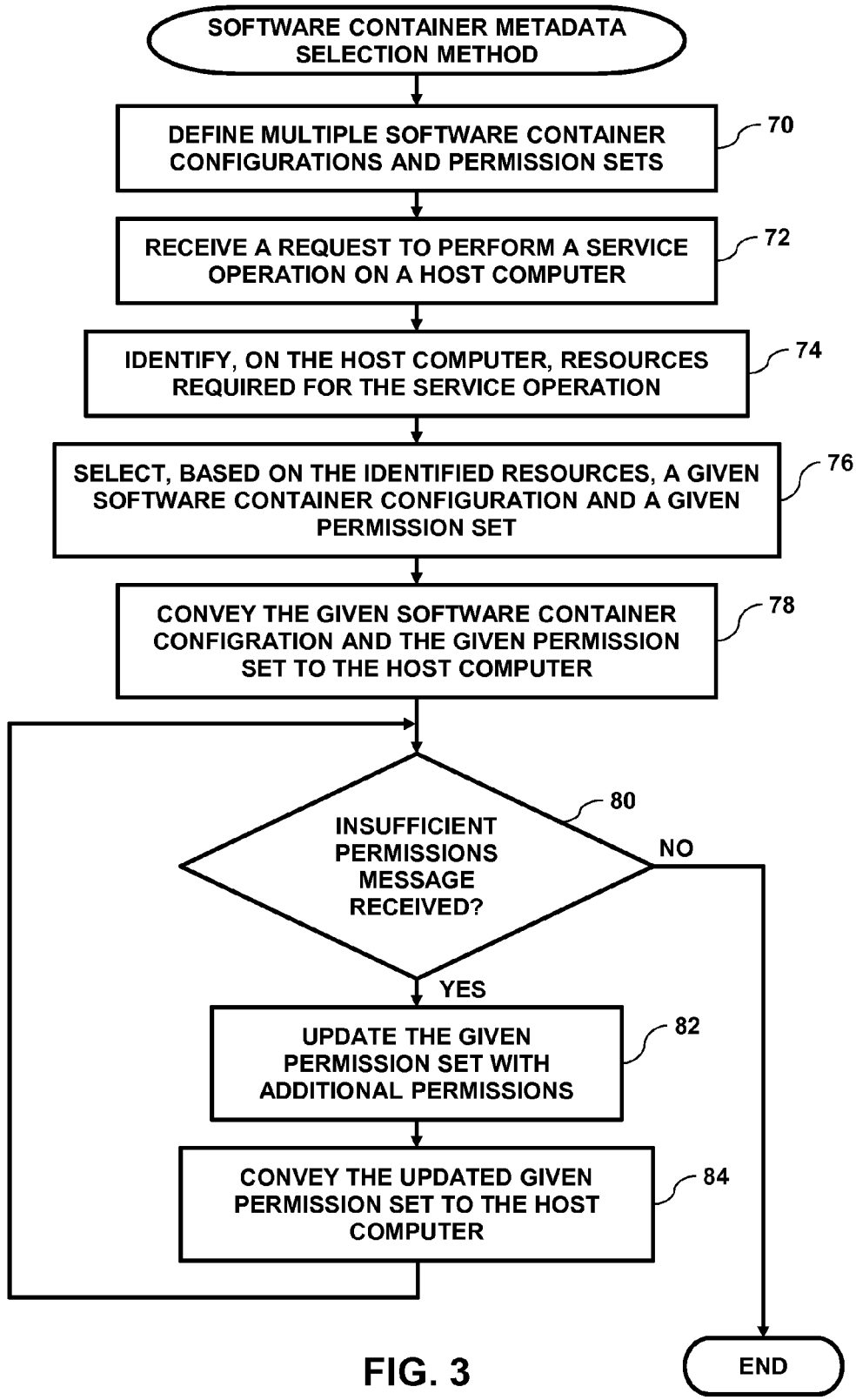
FIG. 3 is a flow diagram that schematically illustrates a method of selecting a container configuration and a permission set to be used for generating a software container in a host computer, in accordance with an embodiment of the present invention.

FIG. 3 is a flow diagram that schematically illustrates a method of selecting metadata (e.g., a given container configuration 50 and a given permission set 51) that host computer 24 can use to generate software container 36 for use when processing a service ticket for the host computer, in accordance with an embodiment of the present invention. In definition step 70, processor 30 initializes facility 20 by defining software container configurations 50 and permission sets 51, and in a receive step 72, the first processor receives a request to open a service ticket for performing a service operation on host computer 24.

In an identification step 74, processor 30 identifies one or more resources on host computer 24 that a system administrator requires (i.e., needs access to) in order to perform the service operation, and in a first select step 76, the first processor selects, based on the required resources, a given software configuration 50 and a given permission set 51. In some embodiments, the service operation to be performed by the system administrator may require resources on multiple host computers 24, and the selected permission set may therefore include one or more networking permissions. When working with multiple host computers 24 while performing a single service operation, each of the host computers may execute its own separate container 36.

In a first transmission step 78, processor 30 conveys, via network 28, the (selected) given software configuration and the given permission set to host computer 24. In a first comparison step 80, if processor 30 receives an insufficient permissions message from host computer 24, then in a second selection step 82, ticket handler application 34 updates the given permission set with additional permissions. As described in the description referencing FIG. 4 hereinbelow, processor 38 conveys the insufficient permissions message to computer 22 if the service operation associated with the service ticket cannot be completed using the first given permission set.

In a second transmission step 84, ticket handler application 34 conveys the updated given permission set to host computer 24, and the method continues with step 80. In some embodiments, ticket handler application 34 can, in step 84, simply convey the permissions that were added in step 82 (i.e., instead of conveying the entire updated permission set).

Returning to step 80, the method ends if processor 30 does not receive an insufficient permissions message. In some embodiments, processor 30 can receive a message from host computer indicating completion of the service operation and thereby indicating the first given permission set had sufficient privileges to perform the service operation.

Figure 4:
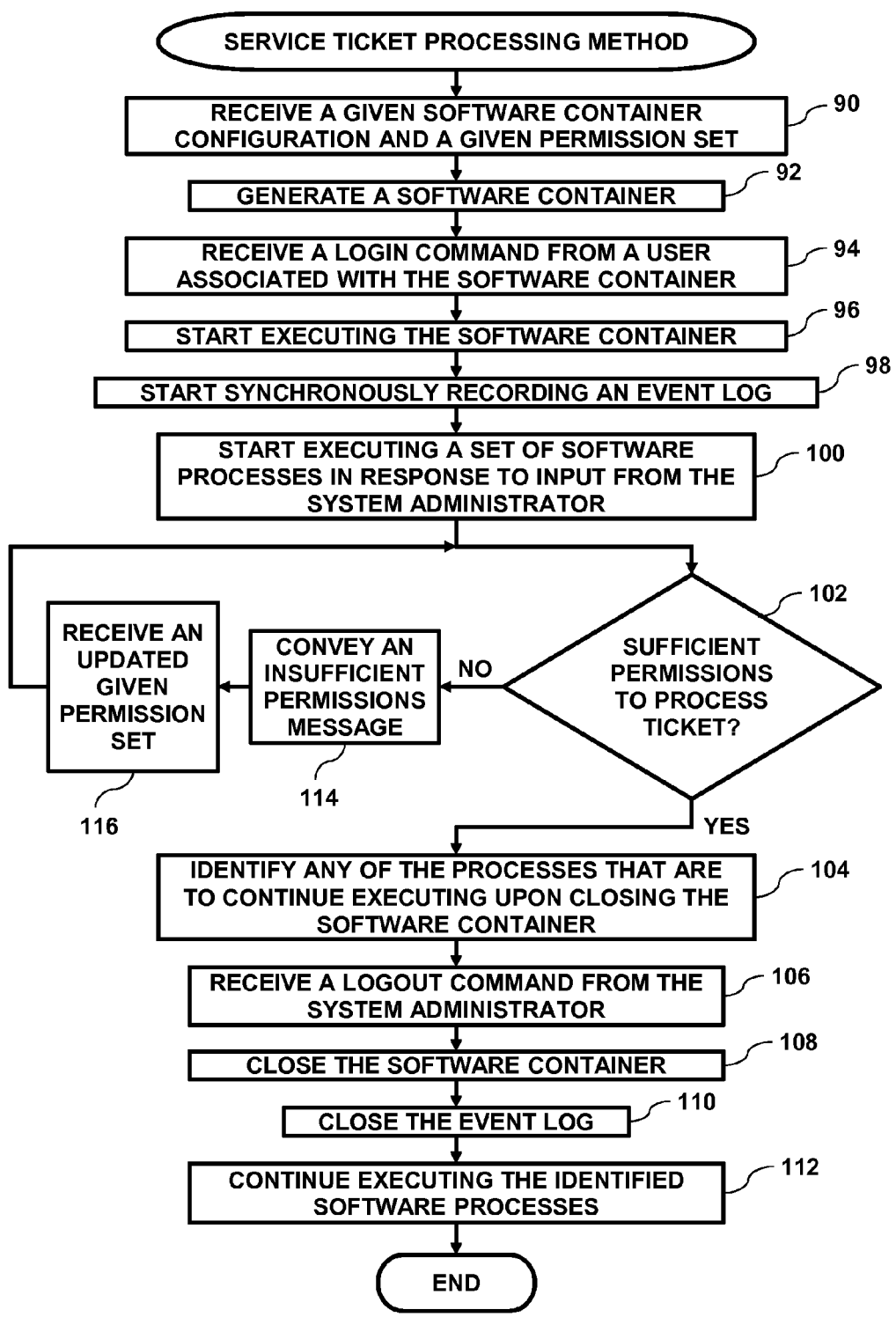
FIG. 4 is a flow diagram that schematically illustrates a method of generating the software container and using the software while processing a service ticket on the host computer, in accordance with an embodiment of the present invention.

FIG. 4 is a flow diagram that schematically illustrates a method of generating container 36, and using the software container while processing a service ticket on host computer 24, in accordance with an embodiment of the present invention. In a first receive step 90, processor 38 receives a given container configuration 50 and a given permission set 51, and in a generation step 92, the second processor uses the given container configuration and the given permission set to generate container 36. To generate container 36, processor 38 can execute, from memory 42, a container application such as Docker™.

Upon receiving, in a second receive step 94, a login command from a system administrator associated with container 36, processor 38 starts executing (i.e., opens) software container 36 in an first execution step 96, and starts synchronously recording events 60 (i.e., keyboard entries) to event log 58 in a recording step 98. In embodiments of the present invention, in response to detecting the login by the system administrator, processor 38 start executing container 36, which provides access to resources that the system administrator needs to perform the requested service operation.

While performing the requested service operation, processor 38, in a second execution step 100, starts executing a set of software processes 52 in response to input received from the system administrator. In a comparison step 102, if there are sufficient permissions, in the received permission set, to process the service ticket, then processor 38 continues to process commands in response to input received from the system administrator while performing the service operation.

In an identification step 104, processor 38 identifies any of processes 52 that are to continue to be executed upon the system administrator completing the service operation and closing software container 36. In some embodiments, processor can identify one or more processes 52 based on input received from the system administrator. Upon completing the service operation, the system administrator inputs a logout command, and in response to receiving the logout command in a third receive step 106, processor 38 closes software container 36 in a first closing step 108, and conveys a message to processor 54 to close event log 58 in a second closing step 110.

Finally, in a continuation step 112, subsequent to closing software container 36, processor 38 continues to execute one or more of the processes that were identified in step 104, and the method ends. By leaving the one or more processes in a running state, embodiments of the present invention enable the system administrator to leave the host computer fully operational upon completing the service operation.

Returning to step 102, if there are not sufficient permissions in the received permission set for the system administrator to perform the service operation, then processor 38 conveys an insufficient permissions message to computer 22 in a transmission step 114, receives (in response to step 84 described supra) an updated permission set 51 in a fourth receive step 116, and the method continues with step 102.

Figure 5:
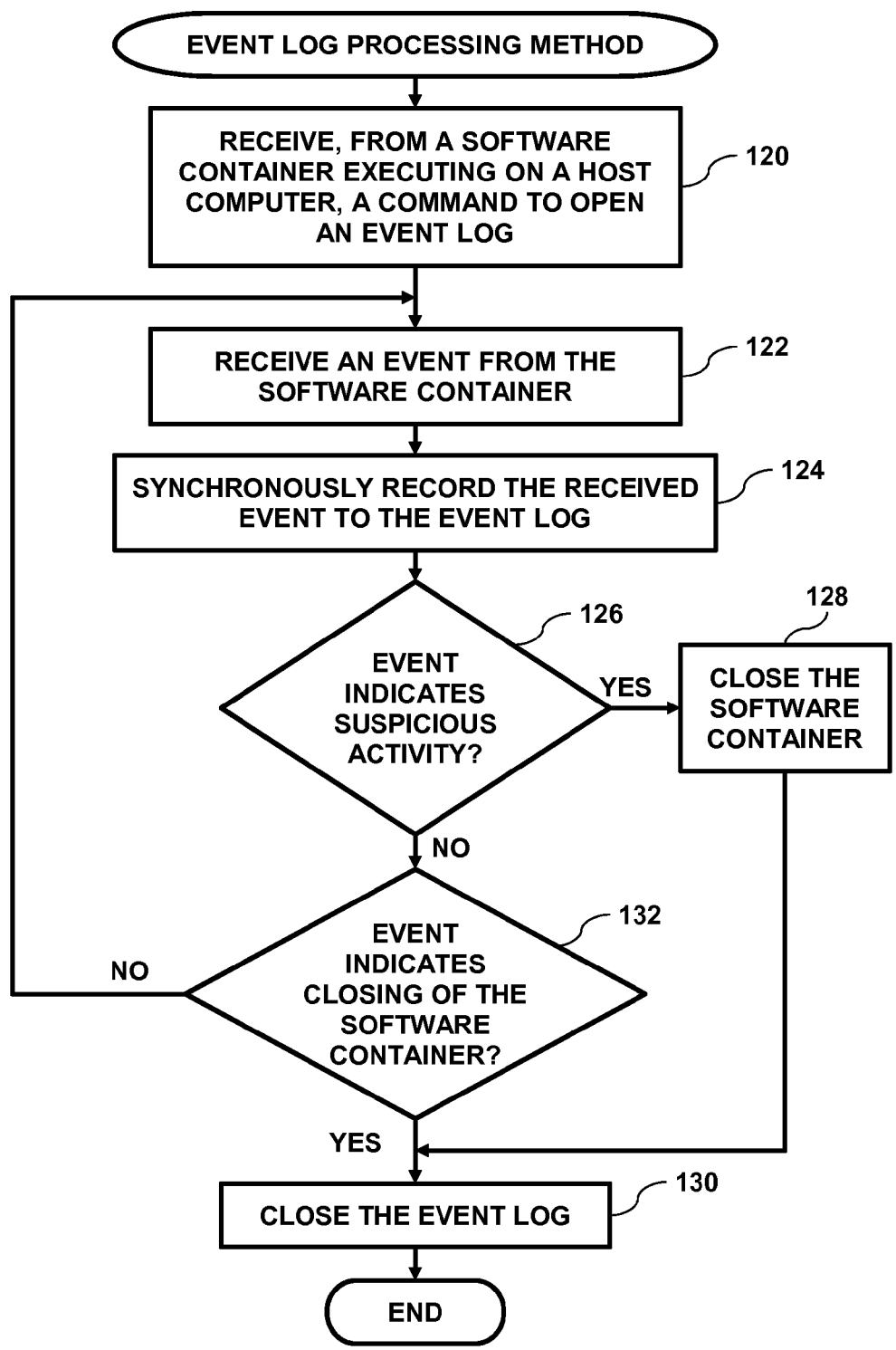
FIG. 5 is a flow diagram that schematically illustrates a method of processing an event log that monitors the software container, in accordance with an embodiment of the present invention.

FIG. 5 is a flow diagram that schematically illustrates a method of processing an event log that monitors software container 36, in accordance with an embodiment of the present invention. In a first receive step 120, processor 54 receives, from container 36, a command to open event log 58. In a second receive step 122, processor 54 receives a container event from container 36, and in a recording step 124, the third processor synchronously stores the container event to a respective event 60 in event log 58.

In a first comparison step 126, if the received container event indicates suspicious activity, then in a first closing step 128, processor 54 conveys a command to processor 38 to close container 36. For example, processor 54 may detect a sequence of container events that indicate that the system administrator is attempting to install malware on host computer 24, and in response to detecting the sequence of container events, processor 54 initiates a closing of container 36.

In a second closing step 130, processor 54 closes event log 58, and the method ends. Returning to step 126, if the received container event does not indicate suspicious activity, then in a second comparison step 132, processor 54 checks if the received container event indicates that processor 38 closed container 36 (i.e., upon the system administrator completing the service operation). If the received event indicates that processor 38 closed container 36, then the method continues with step 130. However, if the received event does not indicate that processor 38 closed container 36, then the method continues with step 122.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining a first multiple of software container configurations and a second multiple of permission sets;
receiving, by a first physical computer, a request to perform a service operation on a second physical computer having multiple resources and coupled to the first physical computer via a network;
identifying, by the first physical computer, one or more of the resources that are required for the service operation;
selecting, by the first physical computer based on the identified one or more resources, a given software container configuration and a given permission set;

conveying, by the first physical computer via the network, the given software container configuration and the given permission set to the second physical computer;

receiving, by the second physical computer, the given software container configuration and the given permission set;

generating, by the second physical computer using the received given software container configuration and the received given permission set, a software container;

executing, by the second physical computer, the generated software container upon initiating the service operation; and closing, by the second physical computer, the generated software container upon completing the service operation.

2. The method according to claim 1, wherein performing the service operation comprises executing, by the second physical computer, a software process, and comprising continuing to execute the software process upon closing the software container.

3. The method according to claim 1, and comprising creating, while performing the service operation, an event log comprising multiple events.

4. The method according to claim 3, wherein creating the event log comprises conveying, by the second physical computer, each of the events to a third physical computer, and synchronously storing, by the third physical computer, the events to the event log, and comprising closing, by the third physical computer, the software container upon detecting a given event comprising a suspicious activity.

5. The method according to claim 1, wherein each given software container configuration and each given permission set has access to a subset of the resources.

6. The method according to claim 1, wherein initiating the service operation comprises receiving a login command from a user associated with the generated software container, and wherein completing the service operation comprises receiving a logout command from the user.

7. A computing facility, comprising:
multiple physical computers configured to communicate over a network, wherein a first given physical computer is configured:
to define a first multiple of software container configurations and a second number of permission sets,
to receive a request to perform a service operation on a second given computer having multiple resources,
to identify one or more of the resources that are required for the service operation,
to select, based on the identified one or more resources, a given software container configuration and a given permission set, and
to convey the given software container configuration and the given permission set to the second given computer,
and wherein the second physical computer is configured:
to receive the given software container configuration and the given permission set;
to generate the received given software container configuration and the received given permission set, a software container;
to execute the generated software container upon initiating the service operation; and
to close the generated software container upon completing the service operation.

8. The computing facility according to claim 7, wherein the second physical computer is configured to perform the service operation by executing a software process, and wherein the second physical computer is configured to continue to execute the software process upon closing the software container.

9. The computing facility according to claim 7, wherein the second physical computer is configured to create, while performing the service operation, an event log comprising multiple events.

10. The computing facility according to claim 9, wherein the second physical computer is configured to create the event log by conveying each of the events to a third given physical computer, and wherein the third physical computer is configured to synchronously store the events to the event log, and to close the software container upon detecting a given event comprising a suspicious activity.

11. The computing facility according to claim 7, wherein each given software container configuration and each given permission set has access to a subset of the resources.

12. The computing facility according to claim 7, wherein the second physical computer is configured to initiate the service operation by receiving a login command from a user associated with the generated software container, and wherein the second physical computer is configured to complete the service operation by receiving a logout command from the user.

13. A computer program product, the computer program product comprising:
a non-transitory computer readable storage medium having computer readable program code embodied therewith, the computer readable program comprising:
computer readable program code configured to define a first multiple of software container configurations and a second multiple of permission sets;
computer readable program code executing on a first physical computer and configured to receive a request to perform a service operation on a second physical computer having multiple resources;
computer readable program code executing on the first physical computer and configured to identify one or more of the resources that are required for the service operation;
computer readable program code executing on the first physical computer and configured to select, based on the identified one or more resources, a given software container configuration and a given permission set;
computer readable program code executing on the first physical computer and configured to convey the given software container configuration and the given permission set to the second physical computer;
computer readable program code executing on the second physical computer and configured to receive the given software container configuration and the given permission set;
computer readable program code executing on a first physical computer and configured to generate, using the received given software container configuration and the received given permission set, a software container;
computer readable program code executing on the second physical computer and configured to execute the generated software container upon initiating the service operation; and
computer readable program code executing on the second physical computer and configured to close the generated software container upon completing the service operation.

14. The computer program product according to claim 13, wherein the computer readable program code executing on the second physical computer is configured to perform the service operation by executing a software process, and comprising computer readable program code executing on the second physical computer and configured to continue to execute the software process upon closing the software container.

15. The computer program product according to claim 13, and comprising computer readable program code executing on the second physical computer and configured to create, while performing the service operation, an event log comprising multiple events.

16. The computer program product according to claim 15, wherein the computer readable program code executing on the second physical computer is configured to create the event log by conveying each of the events to a third physical computer, and comprising computer readable program code executing on the third physical computer and configured to synchronously store the events to the event log, and to close the software container upon detecting a given event comprising a suspicious activity.

17. The computer program product according to claim 13, wherein the computer readable program code executing on the second physical computer is configured to initiate the service operation by receiving a login command from a user associated with the generated software container, and wherein the computer readable program code executing on the second physical computer is configured to complete the service operation by receiving a logout command from the user.

\* \* \* \* \*